March 31, 1931. A. A. WARD 1,798,769

POULTRY DRINKING FOUNTAIN

Filed Oct. 10, 1928

INVENTOR
A. A. Ward
BY
ATTORNEY

Patented Mar. 31, 1931

1,798,769

UNITED STATES PATENT OFFICE

ANDREW A. WARD, OF OAKLAND, CALIFORNIA, ASSIGNOR OF ONE-FOURTH TO THEODORE E. FULLMER, OF OAKLAND, CALIFORNIA

POULTRY DRINKING FOUNTAIN

Application filed October 10, 1928. Serial No. 311,451.

This invention relates to drinking fountains for poultry, my principal objects being to provide a device of this character which is of an absolutely sanitary nature in that the water actually drank is always in a clean condition and each fowl may drink from an individual supply of water, which cannot possibly come in contact with or be contaminated by that from which other fowls have partaken; one in which no stale water can accumulate to become hot, insipid and unhealthy; one in which the disagreeable task of cleaning is reduced to a minimum; one in which the usual open trough in which the poultry can wade or pollute, or in which baby chicks can drown, is eliminated; one which of its very nature induces the poultry to drink more water than is ordinarily the case; and one in which a gravity flow of water of a constant velocity, regardless of the feed-in pressure, is maintained.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
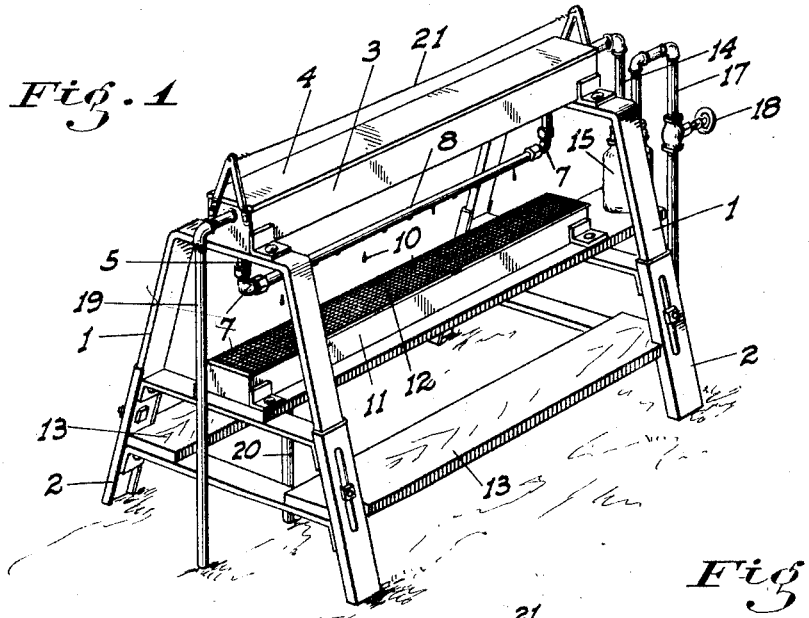
Fig. 1 is a perspective view of my improved fountain.
Figure 2:
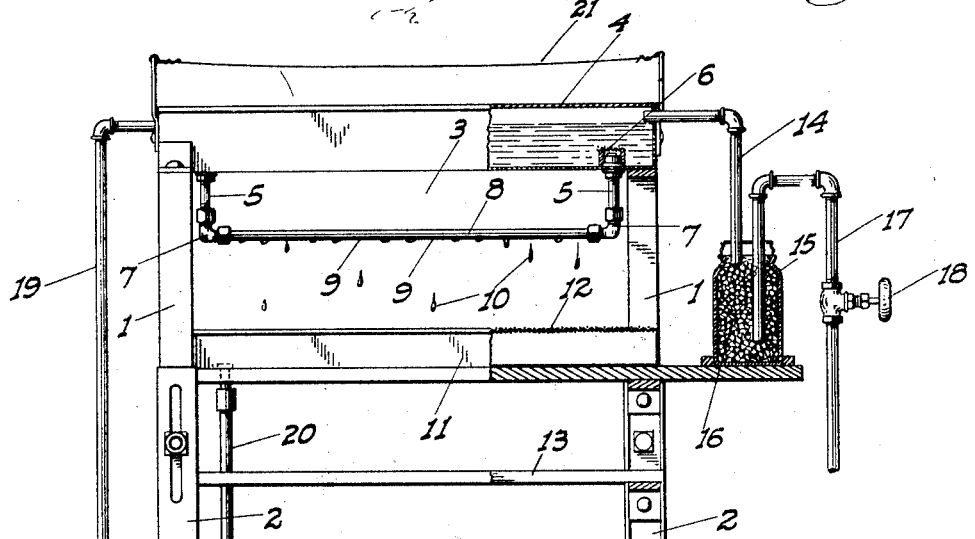
Fig. 2 is a side elevation of the same partly in section.

Referring now more particularly to the characters of reference on the drawings, the numeral 1 denotes end frames of a suitable nature, having vertically adjustable extensions or legs 2 to enable the height of the structure to be altered. Supported by the frames from the top and extending therebetween is a longitudinal tank 3 provided with a removable cover 4. Depending from the tank at its ends are short pipes 5, the entrance to which from the tank is covered by removable screen caps 6.

Secured to the lower end of the pipes by detachable elbow fittings 7 of the common compression type is a horizontal pipe 8. This pipe is provided with a row of small perforations 9 along its under side of such a nature that only drops of water as at 10 will fall rather than a continuous stream. The detachable fittings enable the pipe to be readily removed for cleaning without disturbing any other parts of the device.

Supported by the end frames some distance below the drip pipe is a catch trough 11, transversely alined with the pipe and extending the full length thereof to catch all water dropping from the pipe and not consumed. This trough is permanently covered by a screen 12. Also supported by the end frames below and to the sides of the catch trough are platforms 13, positioned so that the poultry standing thereon can conveniently reach the drops falling from the drip pipe. The water is fed into the top of the tank by a feed pipe 14 connected therewith at one end and preferably leading into a vessel 15 supported from the adjacent end frame and containing a suitable filler substance 16. The actual water supply pipe 17, with a hand valve 18 interposed therein, discharges into the vessel 15 which is sealed so that the water cannot overflow.

An overflow pipe 19 leads from the opposite end of the tank nearer the top, while the trough 11 also has a drain pipe 20 depending from the bottom of the same at one end.

From the above description it will be seen that the only water exposed and available for the poultry to drink is the filtered drops falling from the drip pipe, and such drops glistening as they fall have been proved to be very attractive to poultry, which reach up with open beaks and allow the drops to fall down their throats. In this manner the poultry get the full benefit of all the water they take into their beaks and none is wasted. Since the drops are either actually consumed by the fowl or discharged into the catch trough, it will be seen that no two chicks can possibly come in contact with each other's supply, so that there is no danger of the water supply being contaminated by a diseased fowl—a condition which in the ordinary open trough causes the disease to spread among the flock and results in a great many deaths. The use of my improved fountain entirely eliminates such occurrences.

There being no open trough from which the poultry drink and in which they can wade, an accumulation of stale water is eliminated and the need of frequent cleaning to maintain the structure in a sanitary condition is avoided, since the platforms 13 are practically the only parts liable to become foul, since the drain trough is too close to the drip pipe to permit the chicks to stand thereon.

To further promote cleanliness of the structure, a slack wire 21 extends lengthwise of and a short distance above the tank 3—a device which effectually prevents any poultry from roosting on the tank.

Since the pipe 9 receives its supply from the tank by gravity flow, regardless of the actual pressure or force of the flow of water in the feed line, it will be seen that the drips from the pipe are constant and of the same velocity at all times, and no constant regulation of the valve 18 is necessary to offset any fluctuation in the flow. The amount of water fed into the tank may be regulated by the valve 18 to prevent an excessive amount of water flowing into and out of the same. If a pressure feed system is not available the same results may be obtained by filling the tank 3 by means of a bucket or the like, thereby giving a supply ample for every hour's use.

Figure 3:
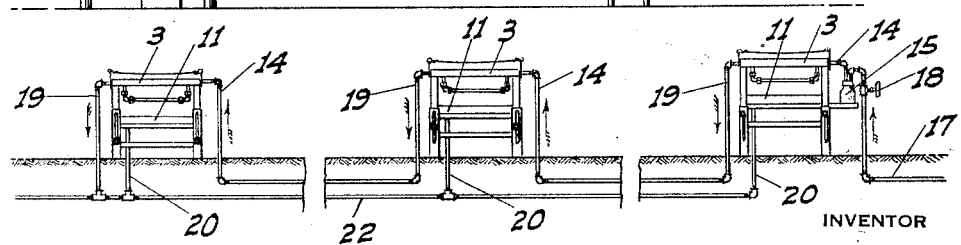
Fig. 3 is a diagram showing a row of fountains arranged to be all connected with a single water supply and discharge line.

If a large flock of poultry is to be watered a battery of the fountains may be mounted at predetermined spaced intervals. In such a case the extensions 2 are set so that the fountains lie at successively different levels so as to enable all the tanks 3 to be fed by gravity from a single main pipe 17 connected to the highest one. The drain pipe 19 from the highest tank then leads to the intake end of the tank of the next fountain in the row as shown in Fig. 3, and so on; while the trough drain pipes 20 are all connected to a single underground pipe 22 leading to a single point of discharge, such as a sewer, or a garden to be irrigated. This cheapens the cost of installation, since only one filter structure and one main control valve are necessary, as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A poultry drinking fountain including a freely exposed horizontal drip pipe, means for supporting said pipe a predetermined distance clear of the ground, and means for supplying water to said pipe.

2. A poultry drinking fountain including a freely exposed horizontal drip pipe, means for supporting said pipe a predetermined distance clear of the ground, and gravity-flow water supply means for said pipe.

3. A poultry drinking fountain including a freely exposed horizontal drip pipe, a water supply tank above said pipe, a vertical pipe between said tank and drip pipe and supporting the latter from the tank, and means for supporting the tank a predetermined distance from the ground.

4. A poultry drinking fountain including a freely exposed horizontal drip pipe, means for supporting said pipe a predetermined distance clear of the ground, means for supplying water to said pipe, and a screened catch trough disposed below and mounted in fixed relationship with and extending the full length of said pipe.

5. A poultry drinking fountain including a horizontal tank arranged to contain a supply of water, means supporting said tank a predetermined distance from the ground, vertical pipes spaced longitudinally of the tank depending therefrom, a horizontal drip pipe under the tank, and passage fittings detachably connecting said drip pipe at its ends with the vertical pipes.

6. A poultry drinking fountain including a horizontal exposed drip pipe freely perforated along its lower side, means for supplying water to said pipe, and a poultry supporting platform disposed below the level and to one side of and along the pipe.

7. A poultry drinking fountain including a horizontal exposed drip pipe freely perforated along its lower side, means for supplying water to said pipe, a poultry supporting platform disposed below the level and to one side of and along the pipe, and a continuous screened catch trough disposed directly under the pipe; said trough being sufficiently close to the pipe to prevent poultry standing on the trough and clearing the pipe.

8. A poultry drinking fountain including a horizontal exposed drip pipe freely perforated along its lower side, a tank above and connected to said pipe, means for constantly supplying water to the tank, an overflow pipe from the tank, a catch trough below and extending along said drip pipe, a drain pipe from said trough; and a common carry-off pipe to which said overflow and drain pipes are connected.

9. A poultry drinking fountain including a horizontal exposed drip pipe freely perforated along its lower side, means for supporting said pipe a predetermined distance clear of the ground, and means for supplying water at a common pressure to both ends of the pipe simultaneously.

In testimony whereof I affix my signature.

ANDREW A. WARD.